United States Patent
Hiramatsu et al.

(10) Patent No.: US 11,933,603 B2
(45) Date of Patent: Mar. 19, 2024

(54) MEASUREMENT APPARATUS, INFORMATION PROCESSING APPARATUS, AND NON-TRANSITORY COMPUTER READABLE MEDIUM

(71) Applicant: FUJIFILM BUSINESS INNOVATION CORP., Tokyo (JP)

(72) Inventors: Takashi Hiramatsu, Kanagawa (JP); Jungo Harigai, Kanagawa (JP); Yoshitaka Kuwada, Kanagawa (JP)

(73) Assignee: FUJIFILM BUSINESS INNOVATION CORP., Tokyo (JP)

(*) Notice: Subject to any disclaimer, the term of this patent is extended or adjusted under 35 U.S.C. 154(b) by 720 days.

(21) Appl. No.: 16/935,935

(22) Filed: Jul. 22, 2020

(65) Prior Publication Data
US 2021/0302154 A1    Sep. 30, 2021

(30) Foreign Application Priority Data

Mar. 27, 2020  (JP) .................. 2020-058149

(51) Int. Cl.
*G01B 11/26*  (2006.01)
*G01N 21/88*  (2006.01)
(Continued)

(52) U.S. Cl.
CPC ......... *G01B 11/26* (2013.01); *G01N 21/8851* (2013.01); *H04N 1/401* (2013.01); *G01S 17/06* (2013.01)

(58) Field of Classification Search
None
See application file for complete search history.

(56) References Cited

U.S. PATENT DOCUMENTS 5,531,087 A * 7/1996 Kitabayashi ............. B21D 5/02
72/7.2
7,010,863 B1 * 3/2006 Juvinall ............. G01N 21/9045
33/522
(Continued)

FOREIGN PATENT DOCUMENTS

JP    S61-206810 U    12/1986
JP    2014-240830 A    12/2014
(Continued)

OTHER PUBLICATIONS

Nov. 28, 2023 Office Action issued in Japanese Patent Application No. 2020-058149.

*Primary Examiner* — Eric L Bolda
(74) *Attorney, Agent, or Firm* — Oliff PLC

(57) ABSTRACT

A measurement apparatus includes a light irradiator, a light receiver, and a processor. The light irradiator is able to apply light from multiple directions to a specific portion of a subject to be measured. The light receiver receives light reflected by the specific portion. The processor is configured to: cause the light irradiator to apply light to the specific portion sequentially from the multiple directions; and acquire information concerning a tilt of a surface of the specific portion, based on information on light received by the light receiver when light is applied to the specific portion from a first direction and information on light received by the light receiver when light is applied to the specific portion from a second direction. The multiple directions include the first and second directions.

17 Claims, 12 Drawing Sheets

(51) Int. Cl.
    *G01S 17/06*     (2006.01)
    *H04N 1/401*     (2006.01)

(56) References Cited

U.S. PATENT DOCUMENTS

| | | | |
|---|---|---|---|
| 9,222,882 B2 | 12/2015 | Hirabayashi et al. | |
| 2014/0176938 A1* | 6/2014 | Yang | G01B 11/26 |
| | | | 356/138 |
| 2017/0276476 A1 | 9/2017 | Konno et al. | |
| 2018/0156607 A1* | 6/2018 | He | G01S 17/32 |
| 2018/0313643 A1* | 11/2018 | Odaira | G02B 21/086 |
| 2020/0386541 A1* | 12/2020 | Sonoda | G01B 11/306 |

FOREIGN PATENT DOCUMENTS

| | | |
|---|---|---|
| JP | 2017-134561 A | 8/2017 |
| WO | 2016/194939 A1 | 12/2016 |

* cited by examiner

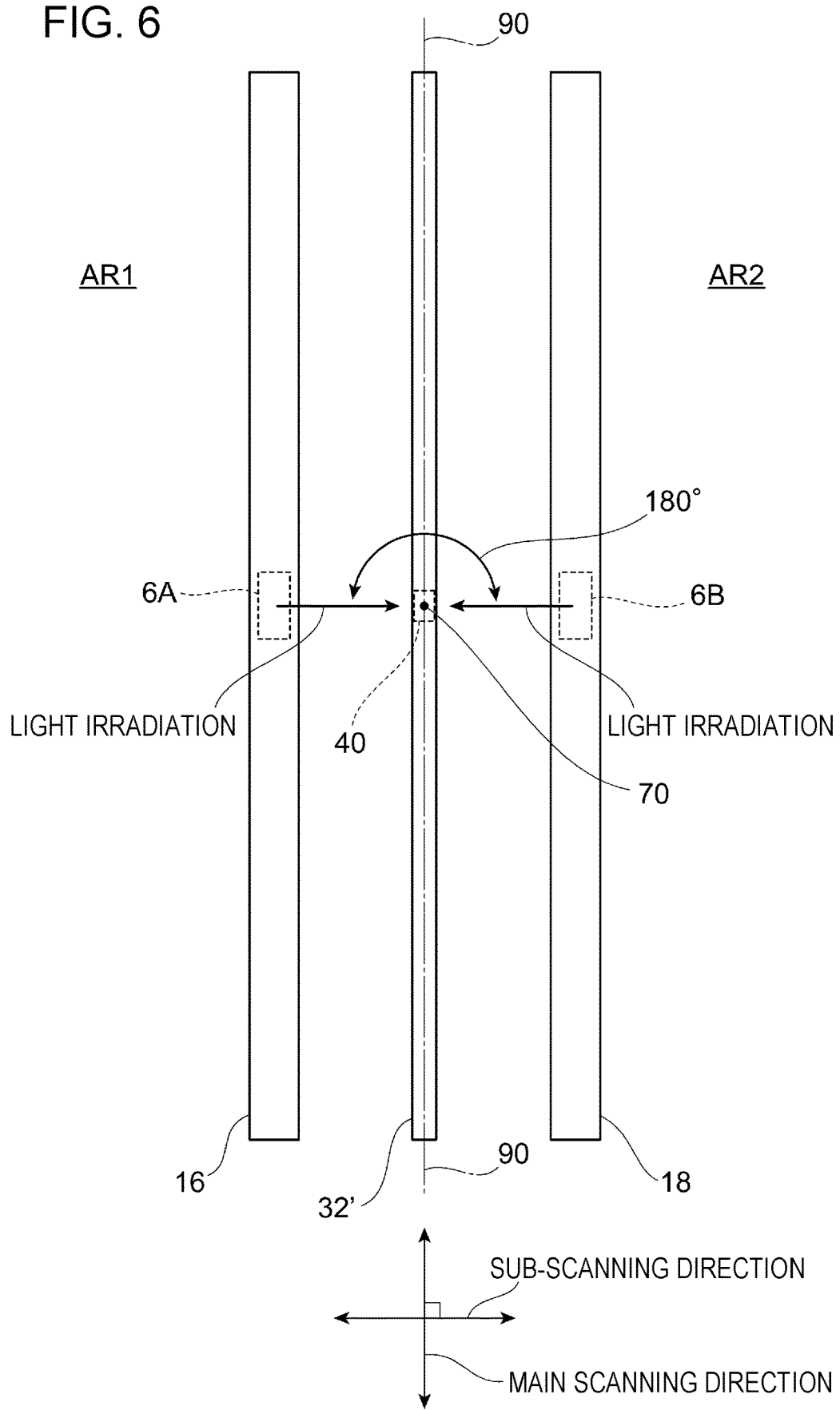

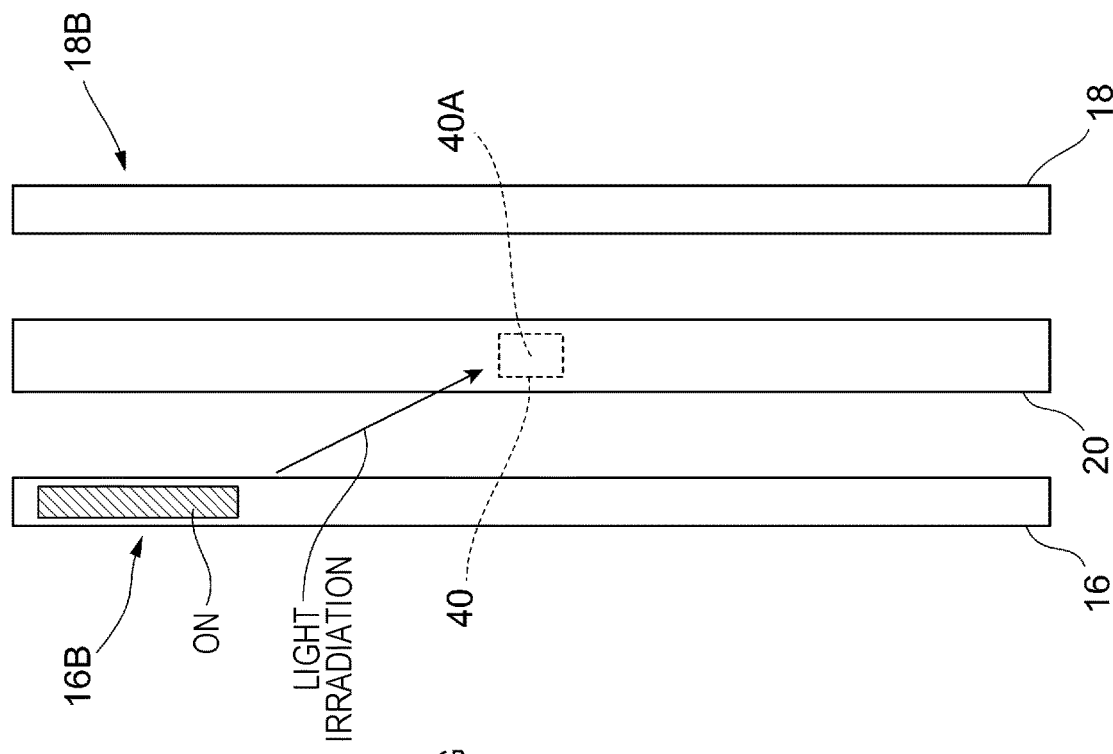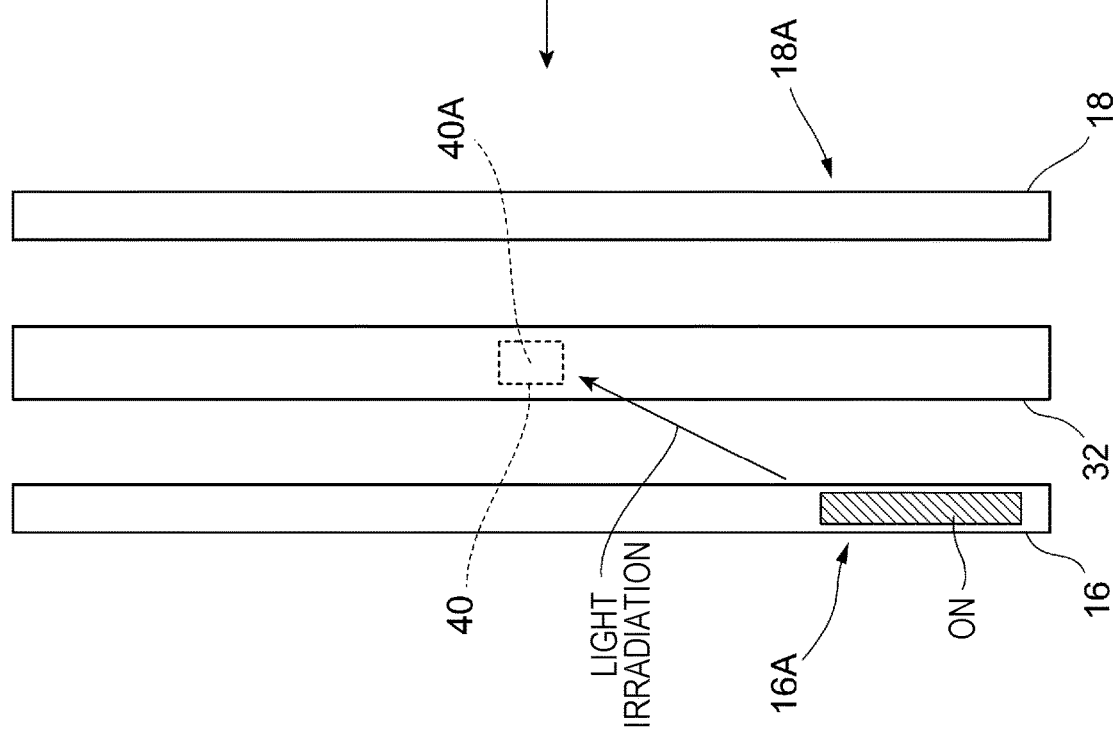

MEASUREMENT APPARATUS, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-058149 filed Mar. 27, 2020.

BACKGROUND

(i) Technical Field

The present disclosure relates to a measurement apparatus, an information processing apparatus, and a non-transitory computer readable medium.

(ii) Related Art

Japanese Unexamined Patent Application Publication No. 2014-240830 discloses the following processing. The scanning distance of a line light source is set in accordance with the characteristics of a subject to be measured. The movement of the line light source and the imaging of an imager are controlled. Reflection characteristics of the subject are estimated from multiple images of the subject captured by the imager.

Japanese Unexamined Patent Application Publication No. 2017-134561 discloses the following device. The device includes a memory, a luminance information obtainer, a selector, and a normal line estimator. In the memory, multiple reflection characteristics models are stored. The luminance information obtainer obtains luminance information concerning a subject from multiple images captured from the subject. The selector selects a specific model from among the multiple reflection characteristics models, based on the obtained luminance information. The normal line estimator obtains normal line information by using the specific model and variations in the luminance information according to the light source conditions.

SUMMARY

To determine how much the surface of a specific portion of a subject is tilted, the following procedure may be taken. Light is applied to the specific portion from one direction, and light reflected by the specific portion is received by a light receiver. Then, based on the intensity of the reflected light, a tilt of the surface of the specific portion is determined.

The intensity of reflected light received by the light receiver is susceptible to the color of the specific portion. That is, the intensity of reflected light varies in accordance with the color of the specific portion. This may fail to accurately determine how much the surface of the specific portion is tilted.

Aspects of non-limiting embodiments of the present disclosure relate to making it possible to determine with higher accuracy how much the surface of a specific portion of a subject is tilted, compared with when such a determination is made by applying light to the specific portion only from one direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a measurement apparatus including a light irradiator, a light receiver, and a processor. The light irradiator is able to apply light from multiple directions to a specific portion of a subject to be measured. The light receiver receives light reflected by the specific portion. The processor is configured to: cause the light irradiator to apply light to the specific portion sequentially from the multiple directions; and acquire information concerning a tilt of a surface of the specific portion, based on information on light received by the light receiver when light is applied to the specific portion from a first direction and information on light received by the light receiver when light is applied to the specific portion from a second direction. The multiple directions include the first and second directions.

BRIEF DESCRIPTION OF THE DRAWINGS

An exemplary embodiment of the present disclosure will be described in detail based on the following figures, wherein:

FIG. 6 illustrates a sensor, first and second light sources, and a specific portion of a subject, as viewed from the direction indicated by the arrow VI in FIG. 3;

FIGS. 7A and 7B illustrate the sensor, the first and second light sources, and a specific portion of a subject, as viewed from the direction indicated by the arrow VII in FIG. 3;

DETAILED DESCRIPTION

An exemplary embodiment of the disclosure will be described below with reference to the accompanying drawings.

Figure 1:
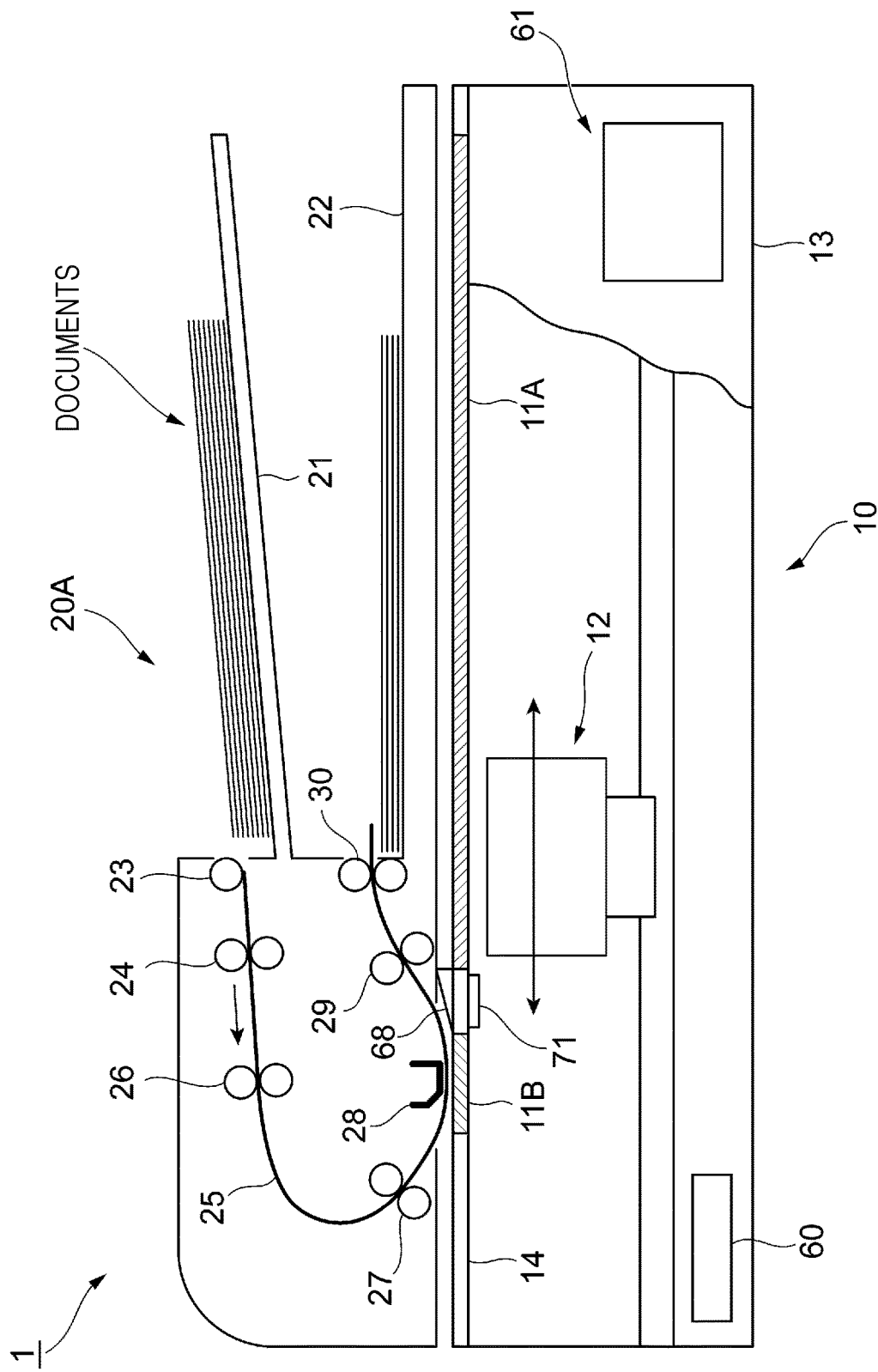
FIG. 1 illustrates the overall configuration of an image reading apparatus.

FIG. 1 illustrates the overall configuration of an image reading apparatus 1.

The image reading apparatus 1 includes a scanner 10 and a document feeder 20A. The scanner 10 scans a document and generates an image of the document. The document feeder 20A feeds documents to the scanner 10.

The document feeder 20A includes a document stacker 21 and a discharged sheet stacker 22. A bundle of multiple documents is placed on the document stacker 21. The discharged sheet stacker 22 is located under the document stacker 21 and receives documents read by the scanner 10 thereon.

The document feeder 20A also includes a feeder roller 23 and a sheet separator 24. The feeder roller 23 feeds documents placed on the document stacker 21. The sheet separator 24 separate documents from each other one by one.

On a transport path 25 through which documents are transported, transport rollers 26 and registration rollers 27 are disposed. The transport rollers 26 transport individual documents separated by the sheet separator 24 toward downstream rollers. The registration rollers 27 supply a document while performing registration on the document to be read by the scanner 10.

On the transport path 25, a chute 28, out rollers 29, and discharge rollers 30 are also disposed. The chute 28 assists the transportation of a document which is being read by the scanner 10. The out rollers 29 transport a read document farther to the downstream side. The discharge rollers 30 discharge a document to the discharged sheet stacker 22.

The scanner 10 includes a housing 13 and an upper cover 14. First platen glass 11A and second platen glass 11B are attached to the upper cover 14. On the first platen glass 11A, a document is placed manually by a user. The second platen glass 11B transmits light to read a document transported by the document feeder 20A.

A guide member 68 is provided between the first platen glass 11A and the second platen glass 11B so as to guide a document transported by the document feeder 20A.

A white reference plate 71, which is an example of an irradiation subject, is provided under the guide member 68. The reference plate 71 has a white surface, which serves as a reference for shading correction. Shade correction will be discussed later.

A reading unit 12 is disposed within the housing 13. The reading unit 12 reads a document placed on the first platen glass 11A and a document transported by the document feeder 20A.

The reading unit 12 also includes a moving mechanism (not shown), which moves the reading unit 12 in the left-right direction in FIG. 1. The moving mechanism is not restricted to a particular type and may be constituted by a known mechanism.

When reading a document placed on the first platen glass 11A, the reading unit 12 shifts along under the first platen glass 11A to the right side.

When reading a document transported by the document feeder 20A, the reading unit 12 remains under the second platen glass 11B.

Inside the reading unit 12, light sources constituted by light emitting diodes (LEDs), for example, an imaging optical system, and a sensor are disposed. The imaging optical system condenses light reflected by a document. The sensor receives light condensed by the imaging optical system. Details of the light sources will be discussed later.

A hinge (not shown) for opening and closing the document feeder 20A is provided on the rear side of the image reading apparatus 1. In the exemplary embodiment, a user can pivot the document feeder 20A toward the rear side of the image reading apparatus 1.

To place a document on the first platen glass 11A, a user pivots the document feeder 20A toward the rear side of the image reading apparatus 1.

After having placed the document on the first platen glass 11A, the user pivots the document feeder 20A toward the front side of the image reading apparatus 1 so as to return the document feeder 20A to the original position.

Then, when the user presses a start button, which is not shown, the reading of the document is started.

In the image reading apparatus 1, a controller 60 is provided to control the individual elements of the image reading apparatus 1.

A display 61 for displaying information is also provided in the image reading apparatus 1. The display 61 may be constituted by a known display, such as a liquid crystal display.

Figure 2:
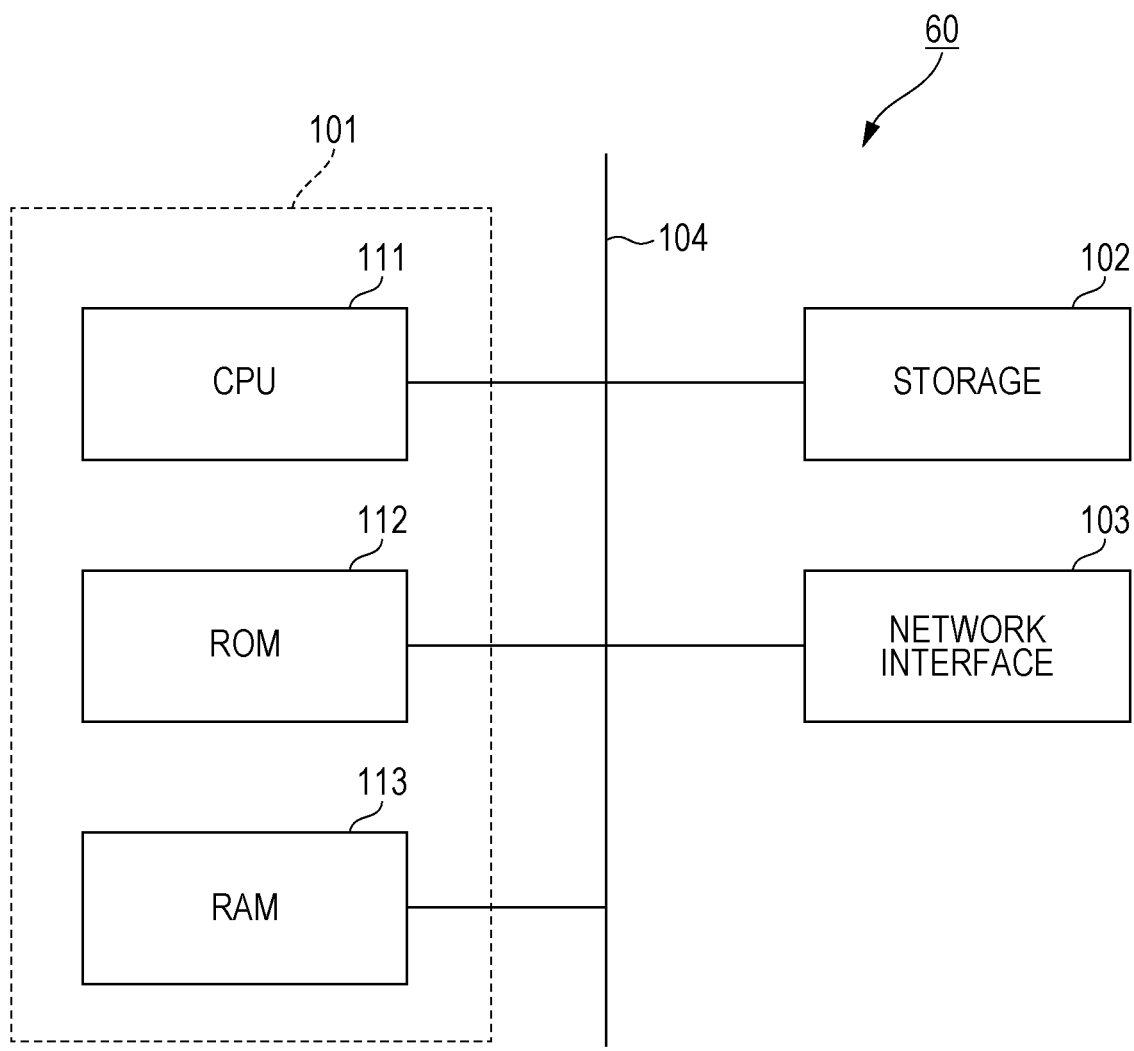
FIG. 2 is a block diagram illustrating the configuration of a controller.

FIG. 2 is a block diagram illustrating the configuration of the controller 60.

The controller 60 includes a control unit 101, a storage 102, and a network interface 103. The control unit 101 controls the operation of the entirety of the image reading apparatus 1. The storage 102 stores data, for example. The network interface 103 implements communication via a local area network (LAN) cable.

The control unit 101 can be regarded as an information processing apparatus that processes information received from a sensor, which is a light receiver. Details of the sensor will be discussed later.

The control unit 101 includes a central processing unit (CPU) 111, a read only memory (ROM) 112, and a random access memory (RAM) 113. The CPU 111 is an example of a processor. In the ROM 112, basic software and a basic input output system (BIOS), for example, are stored. The RAM 113 is used as a work area. The control unit 101 is a computer.

The storage 102 is constituted by a semiconductor memory, for example.

The control unit 101, the storage 102, and the network interface 103 are connected with each other via a bus 104 and a signal line, which is not shown.

A program executed by the CPU 111 may be provided to the image reading apparatus 1 as a result of being stored in a computer readable recording medium, such as a magnetic recording medium (magnetic tape and a magnetic disk, for example), an optical recording medium (an optical disc, for example), a magneto-optical recording medium, and a semiconductor memory.

A program executed by the CPU 111 may be provided to the image reading apparatus 1 via a communication medium, such as the Internet.

[Configuration of Reading Unit 12 and Other Elements]

Figure 3:
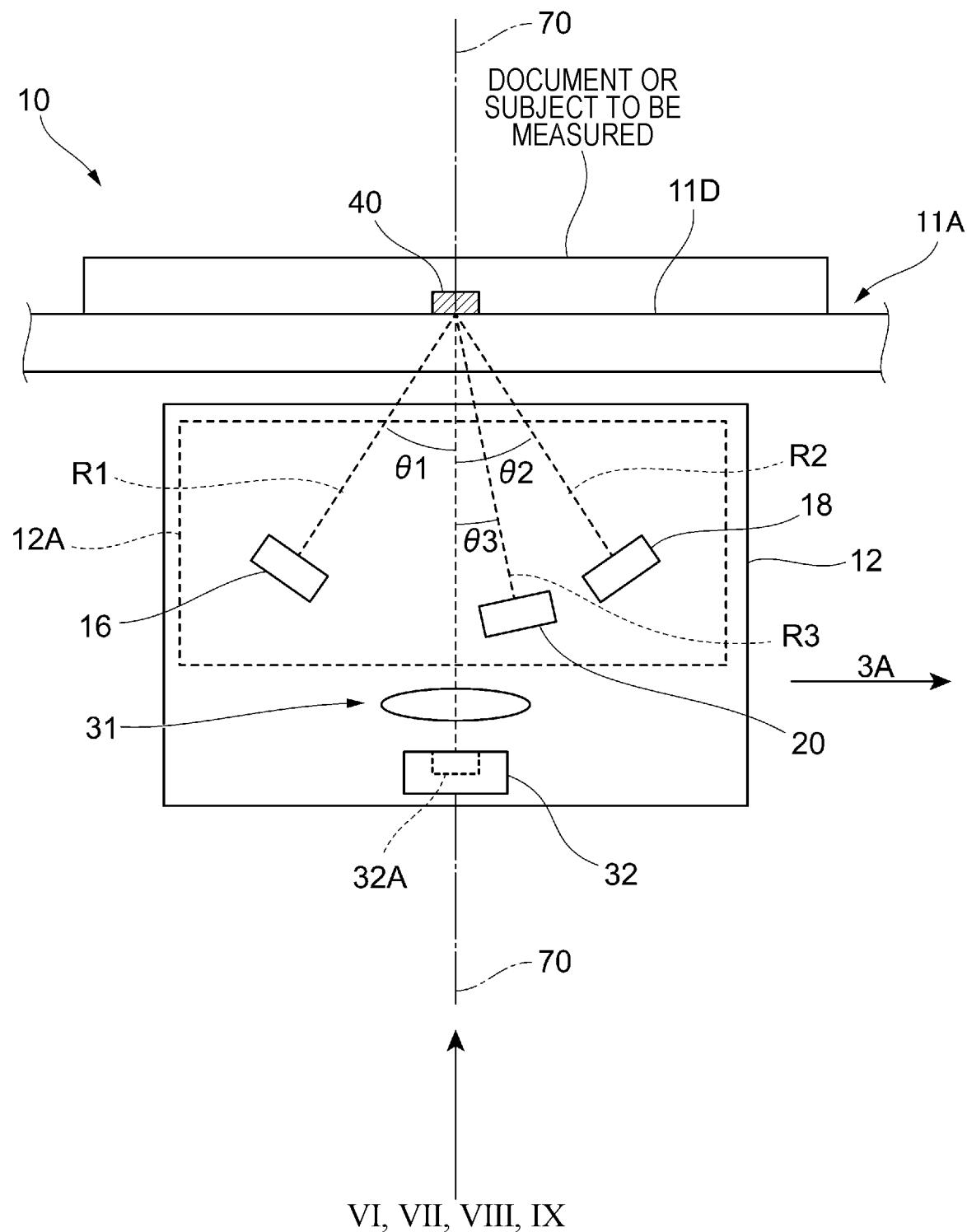
FIG. 3 illustrates the configuration of a reading unit and other elements.

FIG. 3 illustrates the configuration of the reading unit 12 and other elements.

The reading unit 12 includes a light irradiator 12A, which serves as part of a light irradiator in an exemplary embodiment of the disclosure. In the exemplary embodiment, a signal sent from the CPU 111 is input into the light irradiator 12A so that light can be applied to a document.

The light irradiator 12A includes light sources. More specifically, in the exemplary embodiment, three light sources, i.e., a first light source 16, a second light source 18, and a third light source 20, are disposed.

The light irradiator 12A also includes a control unit (not shown) for controlling the ON/OFF operations of the first, second, and third light sources 16, 18, and 20. The control unit may be located at any position, for example, in the body of the scanner 10.

The reading unit 12 also includes an imaging optical system 31 and a sensor 32. The imaging optical system 31 condenses light reflected by a document. The sensor 32 receives light condensed by the imaging optical system 31.

The reading unit 12, which is a movable unit, moves in the direction indicated by the arrow 3A in FIG. 2.

The first platen glass 11A is constituted by a planar transparent glass plate. The first platen glass 11A is disposed along the horizontal direction and supports a document from downward.

More specifically, the first platen glass 11A has a flat support plate 11D facing upward and supports a document from downward by using the support plate 11D. The first platen glass 11A is not restricted to a glass plate and may be an acrylic plate.

Before the scanner 10 reads a document, the document is placed along the flat surface while being supported by the support plate 11D.

In the image reading apparatus 1 of the exemplary embodiment, not only regular document reading (not only obtaining color information), but also information concerning a tilt of the surface of each portion forming a subject can be acquired. In other words, the image reading apparatus 1 of the exemplary embodiment can also be regarded as a measurement apparatus and is able to measure a tilt of the surface of each portion forming a subject to be read.

Processing to be executed when obtaining information concerning a tilt of the surface of a portion forming a subject to be read will be described below. Such a subject will be called a subject to be measured or simply a subject.

A subject is not limited to a particular type. Examples of the subject are paper, cloth, metals, resin, and rubber. The subject is not restricted to a particular shape, either. Paper or cloth, for example, can be rolled up. A subject that can be rolled up is placed on the first platen glass 11A and is then disposed flat along the support plate 11D.

The first light source 16, the second light source 18, and the third light source 20 are located at different positions, so that the light irradiator 12A can apply light to a specific portion 40 of a subject from multiple directions.

In the exemplary embodiment, a portion to be subjected to the measurement of a tilt of a surface is assumed as a specific portion 40. Then, the specific portion 40 can be irradiated with light from multiple directions.

The first, second, and third light sources 16, 18, and 20 each extend along a direction perpendicular to the plane of the drawing of FIG. 3. The first, second, and third light sources 16, 18, and 20 also extend along a direction intersecting with (perpendicular to) the moving direction of the reading unit 12.

In each of the first, second, and third light sources 16, 18, and 20, plural white LEDs (point light sources) are arranged in the main scanning direction.

The first, second, and third light sources 16, 18, and 20 may be constituted by fluorescent lamps or noble gas fluorescent lamps.

As discussed above, the imaging optical system 31 and the sensor 32 are disposed in the reading unit 12.

The sensor 32, which is an example of the light receiver, receives light reflected by a specific portion 40 of a subject.

The sensor 32 extends in a direction perpendicular to the plane of the drawing of FIG. 3. In other words, the sensor 32 extends in a direction intersecting with (perpendicular to) the moving direction of the reading unit 12. The extending direction of the sensor 32 will be called the main scanning direction. The sensor 32 is a line sensor in which light-receiving elements 32A are aligned. Light reflected by a subject in the main scanning direction is formed as an image on the light-receiving elements 32A by the imaging optical system 31. In this manner, the reading unit 12 is able to read a predetermined range of the subject in the main scanning direction at one time.

In the exemplary embodiment, the extending direction of the first, second, and third light sources 16, 18, and 20 and the sensor 32 will be called the main scanning direction. The direction intersecting with the main scanning direction, that is, the moving direction of the reading unit 12, will be called the sub-scanning direction.

When reading a subject, the reading unit 12 moves in the sub-scanning direction at a predetermined speed, and more specifically, in the direction indicated by the arrow 3A in FIG. 3.

The imaging optical system 31 is constituted by a reflecting mirror and an imaging lens, and forms an image represented by light reflected by a specific portion 40 on the sensor 32.

Upon receiving the reflected light formed as an image by the imaging optical system 31, the sensor 32 generates information concerning the intensity of the reflected light and outputs the generated information.

The sensor 32 is constituted by a charge-coupled device (CCD) linear image sensor or a complementary metal oxide semiconductor (CMOS) image sensor, for example, and outputs information concerning the intensity of received light.

In the sensor 32, the multiple light-receiving elements 32A are aligned in the main scanning direction.

The sensor 32 also includes a color filter and generates an image signal indicating the color of a document or a subject. The image reading apparatus 1 of the exemplary embodiment generates three RGB values, such as RGB (165, 42, 42), and outputs them.

In other words, in the exemplary embodiment, the image reading apparatus 1 obtains color information, which is information indicating the color of a document or a subject, and outputs the color information in a predetermined data format, more specifically, in a data format represented by three values.

The first light source 16 is positioned farther upstream in the moving direction of the reading unit 12 than a specific portion 40, and applies light to the specific portion 40 on the downstream side.

The second and third light sources 18 and 20 are positioned farther downstream in the moving direction of the reading unit 12 than the specific portion 40 and applies light to the specific portion 40 on the upstream side.

In the exemplary embodiment, the angle θ1 (angle of incidence) between a perpendicular line 70 and an optical path R1 is 45°. The perpendicular line 70 is perpendicular to the support plate 11D and passes through the specific portion 40. The optical path R1 is a path through which light emitted from the first light source 16 travels to the specific portion 40.

In the exemplary embodiment, the angle θ2 (angle of incidence) between the perpendicular line 70 and an optical path R2 is 45°. The optical path R2 is a path through which light emitted from the second light source 18 travels to the specific portion 40.

In the exemplary embodiment, the angle θ1 between the optical path R1 and the perpendicular line 70 and the angle θ2 between the optical path R2 and the perpendicular line 70 are equal to each other.

In other words, the angle θ1 between the perpendicular line 70 and the optical path R1 through which light travels from one region at which the first light source 16 is located to the specific portion 40 is equal to the angle θ2 between the perpendicular line 70 and the optical path R2 through which light travels from another region at which the second light source 18 is located to the specific portion 40.

In the exemplary embodiment, the angle θ3 (angle of incidence) between the perpendicular line 70 and an optical path R3 is 5°. The optical path R3 is a path through which light emitted from the third light source 20 travels to the specific portion 40.

Because of the provision of the second and third light sources 18 and 20 in addition to the first light source 16, the light irradiator 12A is able to apply light to the specific portion 40 from different directions, that is, from different angles with respect to the perpendicular line 70.

The third light source 20 is located at a position which does not block light reflected by the specific portion 40 to travel to the sensor 32. In other words, the third light source 20 is located at a position displaced from the perpendicular line 70.

More specifically, the portion corresponding to the perpendicular line 70 is an optical path through which light reflected by the specific portion 40 travels to the sensor 32, and the third light source 20 is located at a position displaced from this optical path.

The angle θ3 between the perpendicular line 70 and the optical path R3 is set to be 5° in the exemplary embodiment. However, the angle θ3 may be in a range of about 5° to 10°.

Light reflected by the specific portion 40 travels in the extending direction of the perpendicular line 70 and then reaches the sensor 32 and is received by the sensor 32.

[Reading of Subject and Determining of Normal Angle]

Reading processing for a subject to be measured and determining processing for the angle of a normal line will be described below.

In the exemplary embodiment, the CPU 111 first outputs a control signal to the light irradiator 12A, which is an example of a light irradiator in an exemplary embodiment of the disclosure, and causes it to apply light to a specific portion 40 sequentially from multiple directions.

The CPU 111 then acquires information concerning a tilt of the surface of the specific portion 40, based on information on light received by the sensor 32 when light is applied to the specific portion 40 from one direction and information on light received by the sensor 32 when light is applied to the specific portion 40 from another direction.

In other words, the CPU 111 acquires information concerning a tilt of the surface of the specific portion 40, based on information output from the sensor 32 when light is applied to the specific portion 40 from one direction and information output from the sensor 32 when light is applied to the specific portion 40 from another direction.

Irradiation of a specific portion 40 with light will be explained below in detail.

Figure 4A:
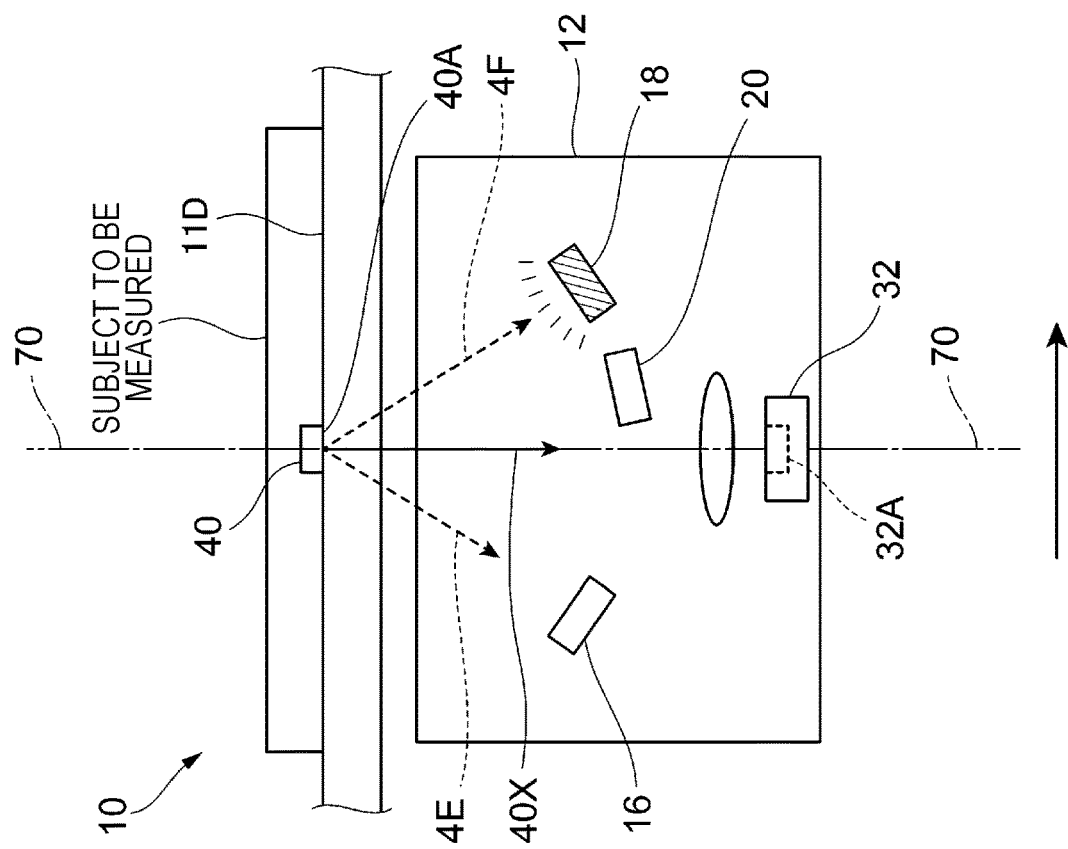
FIGS. 4A and 4B illustrate the states of the reading unit and other elements.
Figure 4B:
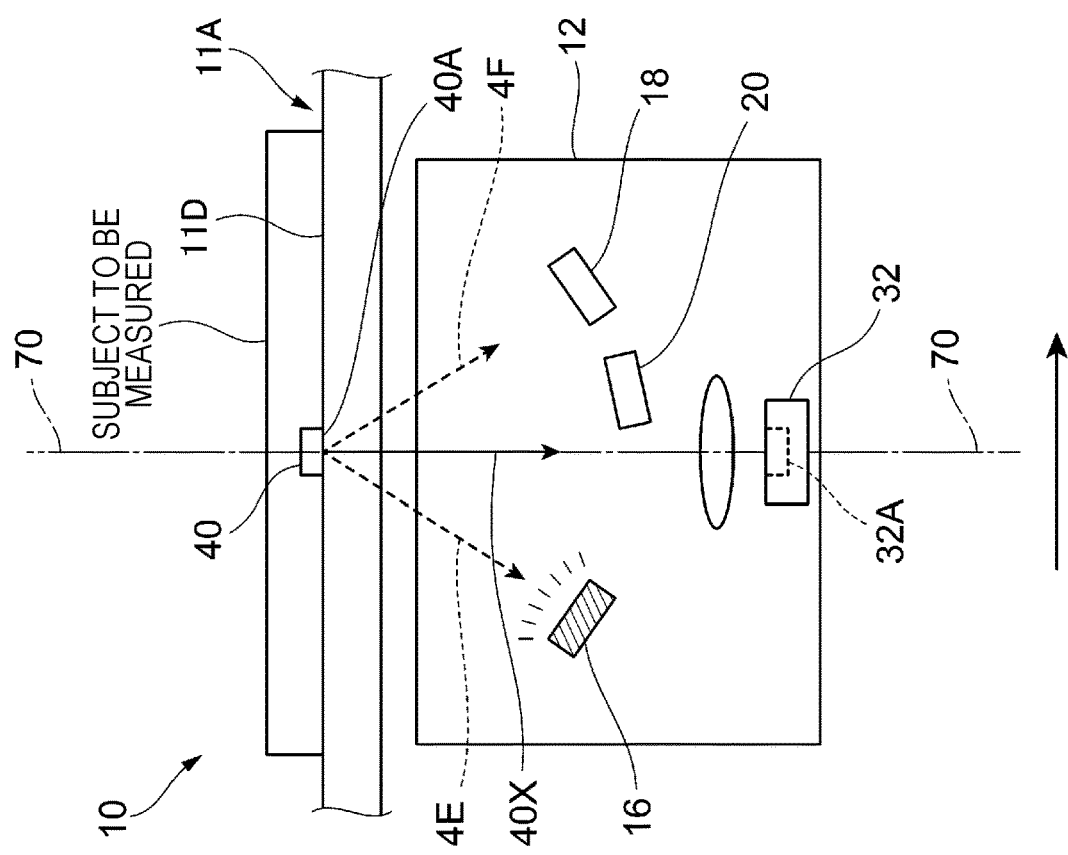

FIGS. 4A and 4B illustrate the states of the reading unit 12 and other elements. As shown in FIG. 4A, the CPU 111 first causes the reading unit 12 to move to the right side in FIG. 4A in the state in which only the first light source 16 is ON. In this case, light is applied to the specific portion 40 from the bottom left direction in FIG. 4A.

The specific portion 40 to be read by the reading unit 12 is sequentially changed in accordance with the movement of the reading unit 12.

In the exemplary embodiment, "specific portion 40" is a portion of a subject to be measured. More specifically, "specific portion 40" is a portion of a subject to be measured and to be read by one of the multiple receiving elements 32A aligned in the sensor 32.

As the reading unit 12 moves, the light-receiving element 32A also moves, and the specific portion 40 read by this light-receiving element 32A is sequentially changed.

Then, as shown in FIG. 4B, the CPU 111 causes the reading unit 12 to move to the right side in FIG. 4B in the state in which only the second light source 18 is ON. In this case, light is applied to the specific portion 40 from the bottom right direction in FIG. 4B.

In this manner, as a result of sequentially and separately turning ON the first and second light sources 16 and 18, light is applied to the specific portion 40 sequentially from multiple directions. More specifically, light is applied to the specific portion 40 first from the bottom left direction and then from the bottom right direction.

In the exemplary embodiment, when the reading unit 12 is moved to the right side in FIGS. 4A and 4B, the first and second light sources 16 and 18 are sequentially turned ON.

Alternatively, the first light source 16 may be turned ON when the reading unit 12 is moved to the right side in FIGS. 4A and 4B, and the second light source 18 may be turned ON when the reading unit 12 is moved to the left side in FIGS. 4A and 4B.

The order in which the first and second light sources 16 and 18 are turned ON is not restricted to that described above. The second light source 18 may be turned ON first, and then, the first light source 16 may be turned ON.

The CPU 111 obtains information on light received by the sensor 32 when light is applied to the specific portion 40 from the bottom left direction. The CPU 111 also obtains information on light received by the sensor 32 when light is applied to the specific portion 40 from the bottom right direction.

In other words, the CPU 111 obtains a value output from the sensor 32 when light is applied to the specific portion 40 from the bottom left direction. The CPU 111 also obtains a value output from the sensor 32 when light is applied to the specific portion 40 from the bottom right direction.

The CPU 111 then acquires information concerning a tilt of the surface of the specific portion 40, based on the information on light received by the sensor 32 (output value from the sensor 32) when light is applied to the specific portion 40 from the bottom left direction and the information on light received by the sensor 32 (output value from the sensor 32) when light is applied to the specific portion 40 from the bottom right direction.

More specifically, if the value represented by the information on light received by the sensor 32 when light is applied to the specific portion 40 from the bottom left direction (hereinafter such information will be called first information) is equal to the value represented by the information on light received by the sensor 32 when light is applied to the specific portion 40 from the bottom right direction (hereinafter such information will be called second information), the CPU 111 determines that a tilt of the surface of the specific portion 40 is 0°.

A perpendicular line 70, which is perpendicular to the support plate 11D and passes through the specific portion 40, is set, as shown in FIG. 4A.

When the first information and the second information are equal to each other, the CPU 111 outputs information indicating that a tilt of a normal line 40X, which is normal to a surface 40A of the specific portion 40, that is, a tilt of the normal line 40A with respect to the perpendicular line 70, is 0°.

When the first information and the second information are different from each other, the CPU 111 outputs information indicating that a tilt of the normal line 40X with respect to the perpendicular line 70 is a value other than 0°.

If the value represented by the first information is greater than that by the second information, the normal line 40X tilts in the direction indicated by the arrow 4E in FIG. 4A.

In this case, the CPU 111 determines the specific angle of the normal line 40X with respect to the perpendicular line 70 (hereinafter such an angle will be called the normal angle), based on the value represented by the first information and that by the second information. Details of determining of the normal angle will be discussed later.

If the value represented by the first information is smaller than that by the second information, the normal line 40X tilts in the direction indicated by the arrow 4F in FIG. 4A.

In this case, the CPU 111 determines the specific angle of the normal line 40X with respect to the perpendicular line 70 (normal angle), based on the value represented by the first information and that by the second information. Details of determining of the normal angle will be discussed later.

[Details of Processing]

Processing to be executed from when light is applied to a specific portion 40 until when the normal angle is determined will be described in detail.

In the exemplary embodiment, shading correction is first performed for the first and second light sources 16 and 18. Details of shading correction will be discussed later.

Then, the first and second light sources 16 and 18 are individually turned ON so as to obtain two scan images.

More specifically, as discussed above, as a result of moving the reading unit 12 in the state in which the first light source 16 is ON and applying light to each specific portion 40 from the bottom left direction, the first scan image is obtained.

Then, as a result of moving the reading unit 12 in the state in which the second light source 18 is ON and applying light to each specific portion 40 from the bottom right direction, the second scan image is obtained.

Thereafter, the two scan images are formed into grayscale images.

Then, two pixel values of the same pixel of the two scan images are extracted. In other words, two pixel values are extracted from the same specific portion 40.

More specifically, the value output from the sensor 32 when light is applied from the first light source 16 to a specific portion 40 and the value output from the sensor 32 when light is applied from the second light source 18 to this specific portion 40 are obtained.

In the exemplary embodiment, a specific portion 40 is read by one light-receiving element 32A, as stated above.

Two output values, that is, the value output from this light-receiving element 32A when light is applied from the first light source 16 to the specific portion 40 and the value output from this light-receiving element 32A when light is applied from the second light source 18 to the specific portion 40 are obtained.

More specifically, the pixel value of the same pixel position (x, y) is extracted from each of the scan images.

The pixel value extracted from one scan image is set to be D_−45(x, y), while that from the other scan image is set to be D_45(x, y).

The numerical value "−45" indicates the angle of incidence of light emitted from the first light source 16, while the numerical value "45" indicates the angle of incidence of light emitted from the second light source 18.

Then, the pixel value (D_−45) obtained when light is applied from the first light source 16 is associated with the angle of incidence "−45°", while the pixel value (D_45) obtained when light is applied from the second light source 18 is associated with the angle of incidence "+45°".

When the angle of incidence with respect to the perpendicular line 70 is ±180°, the value output from the sensor 32 is zero. Accordingly, the pixel value "0" and the angle of incidence "−180°" are associated with each other, while the pixel value "0" and the angle of incidence "+180°" are associated with each other.

The CPU 111 then conducts fitting by using the angle of incidence as an independent variable (−180° to +180°, for example) and the pixel value as a dependent variable (0 to 255, for example).

More specifically, based on the four angles of incidence, −180°, −45°, +45°, and +180°, and the four associated pixel values, the CPU 111 conducts fitting by using the bidirectional reflectance distribution function (BRDF) model (Cook-Torrance) or spline interpolation.

For example, the CPU 111 executes fitting processing for fitting a spline curve to the above-described pixel values.

The CPU 111 then extracts the peak from the spline curve and assumes the independent variable (angle of incidence) corresponding to this peak as the angle of incidence for the surface 40A of a subject specific portion 40.

Based on this angle of incidence, the CPU 111 determines the normal angle of the surface 40A of the specific portion 40.

The CPU 111 executes the above-described fitting processing for all specific portions 40 to determine the normal angle of each specific portion 40.

Figure 5:
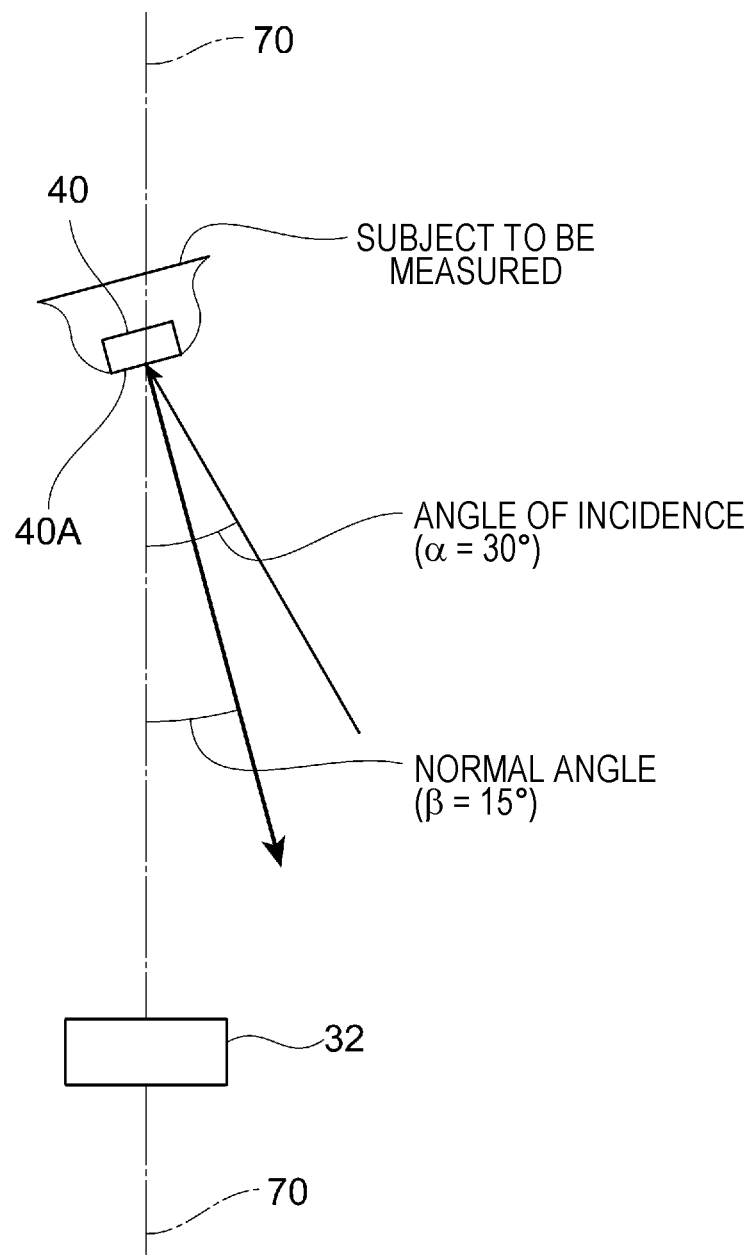
FIG. 5 illustrates the relationship between the angle of incidence and the angle of a normal line.

FIG. 5 illustrates the relationship between the angle of incidence and the normal angle.

In FIG. 5, a represents an example of the angle of incidence determined based on the peak of the spline curve subjected to fitting processing. More specifically, in FIG. 5, the angle of incidence a is 30°.

The CPU 111 sets half the value of this angle of incidence a to be the normal angle β of the surface 40A of the specific portion 40. In this example, the CPU 111 determines that the normal angle β is 15°.

FIG. 6 illustrates a range 32' of a subject that can be read by the sensor 32 at one time, the first and second light sources 16 and 18, and a specific portion 40 of a subject, as viewed from the direction indicated by the arrow VI in FIG. 3.

As described above, as a result of sequentially applying light from the first and second light sources 16 and 18, the specific portion 40 can be irradiated with light from multiple regions of the light sources positioned around the perpendicular line 70.

More specifically, light is applied to the specific portion 40 sequentially from a first region 6A and a second region 6B, for example.

The perpendicular line 70 is taken as a reference. The orientation in which the first region 6A is seen from the perpendicular line 70 is different from that in which the second region 6B is seen from the perpendicular line 70.

Light is applied to the specific portion 40 from multiple regions, and the orientation in which one region is seen from the perpendicular line 70 and that in which another region is seen from the perpendicular line 70 are different from each other.

In this manner, light is applied to the specific portion 40 sequentially from these multiple regions located in different orientations.

When the first and second light sources 16 and 18 are sequentially turned ON, light is applied to the specific portion 40 sequentially from the first region 6A and the second region 6B.

The angle between the orientation in which the first region 6A is seen from the perpendicular line 70 and that in which the second region 6B is seen from the perpendicular line 70 is 180°. Light is applied to the specific portion 40 sequentially from these first and second regions 6A and 6B.

More specifically, the CPU 111 controls ON/OFF operations of the first and second light sources 16 and 18 so that light is applied to the specific portion 40 sequentially from the first and second regions 6A and 6B between which the above-described angle is 180°.

In this manner, by applying light to the specific portion 40 sequentially from two regions between which the above-described angle is 180°, a tilt (normal angle) of the surface 40A of the specific portion 40 can be determined with high accuracy.

Figure 11:
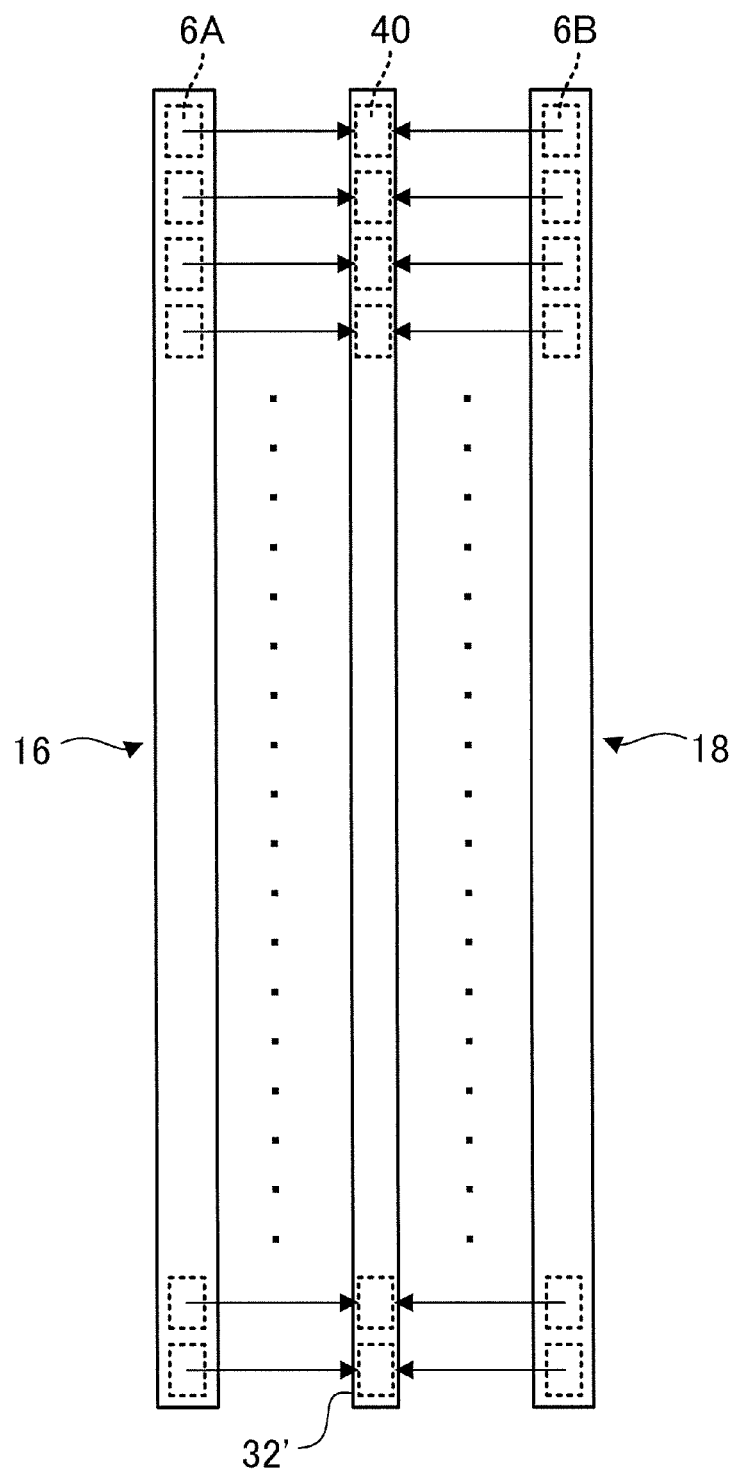
FIG. 11 illustrates the first and second light sources and a specific portion of a subject.

More specifically, as shown in FIG. 11, when each of the first and second light sources 16 and 18 is turned ON, it is ON in the entirety of the main scanning direction. In the exemplary embodiment, when each of the first and second light sources 16 and 18 is ON, an image constituted by pixels for one line in the main scanning direction is read. As a result of the CPU 111 controlling the ON/OFF operations of the first and second light sources 16 and 18, light is applied to each specific portion 40 sequentially from the corresponding first and second regions 6A and 6B located at both sides of the specific portion 40 and forming the above-described angle of 180°.

It is now assumed that light is applied to a specific portion 40 only from one region of a light source to determine a tilt of the surface 40A of the specific portion 40.

In this case, light reflected by the specific portion 40 is received, and a tilt of the surface 40A of the specific portion 40 can still be determined from the intensity of the reflected light.

The intensity of light reflected by a specific portion 40 is susceptible to the color of the specific portion 40. That is, the intensity of reflected light varies in accordance with the color of the specific portion 40. This may fail to accurately determine a tilt of the surface 40A of the specific portion 40.

In contrast, if light is applied to a specific portion 40 sequentially from two regions, as in the exemplary embodiment, the intensity of light is less susceptible to the color of the specific portion 40, thereby making it possible to measure a tilt of the surface 40A of the specific portion 40 more accurately.

As shown in FIG. 6, a plane 90 perpendicular to the support plate 11D and parallel with the main scanning direction and passing through the specific portion 40 is set.

In the exemplary embodiment, light sources (first and second light sources 16 and 18) are respectively disposed in first and second areas AR1 and AR2 located at both sides of the plane 90.

The specific portion 40 is irradiated with light sequentially from the first and second areas AR1 and AR2. This type of light irradiation can reduce the influence of the color of the specific portion 40 and accordingly determine a tilt of the surface 40A of the specific portion 40 with higher accuracy.

In the above-described example, the angle between the orientation of the first region 6A and that of the second region 6B is 180°. However, this angle is not restricted to 180° and may be any value greater than 90°.

In other words, a specific portion 40 may be irradiated with light from two regions between which the above-described angle is greater than 90° and smaller than 180°.

In the image reading apparatus 1 of the exemplary embodiment, because of its configuration, a specific portion 40 is irradiated with light from two regions between which the above-described angle is 180°. Alternatively, point light sources may be used and be moved with respect to the normal line. In this case, light can be applied, not only from two regions between which the above-described angle is 180°, but also from any of two regions between which the angle is smaller than 180°.

If the angle between the orientations of two regions is smaller than 90°, a specific portion 40 is irradiated with light from the same side with respect to the normal line. This is likely to decrease the accuracy in determining a tilt of the surface 40A of the specific portion 40. In contrast, if the angle between the orientations of two regions is larger than 90°, the accuracy in determining a tilt of the surface 40A is enhanced.

The CPU 111 may cause the light irradiator 12A (see FIG. 3) to turn ON a part of a light source disposed linearly and then to turn ON another part of the light source so as to apply light to a specific portion 40 sequentially from multiple directions.

A specific example of this type of light irradiation will be discussed below.

The first light source 16 is disposed along the main scanning direction. FIG. 7A illustrates the sensor 32 and the first and second light sources 16 and 18, as viewed from the direction indicated by the arrow VII in FIG. 3. As shown in FIG. 7A, one part of the first light source 16 in its longitudinal direction may be turned ON, and then, another part of the first light source 16 in its longitudinal direction may be turned ON, as shown in FIG. 7B, thereby irradiating the specific portion 40 with light sequentially from multiple directions.

In the example in FIGS. 7A and 7B, one part of the first light source 16 in its longitudinal direction is turned ON, and then, another part of the first light source 16 separated from the previous part with a gap therebetween is turned ON, thereby applying light to the specific portion 40 sequentially from multiple directions.

More specifically, as shown in FIG. 7A, one end portion 16A of the first light source 16 in its longitudinal direction is turned ON, and then, the other end portion 16B of the first light source 16 is turned ON, as shown in FIG. 7B, thereby applying light to the specific portion 40 sequentially from multiple directions.

As a result of sequentially turning ON one part of the light source 16 in its longitudinal direction and then another part so as to sandwich the specific portion 40 between these two parts, light can be applied to the specific portion 40 from different directions.

That is, the specific portion 40 can be irradiated with light from one side in the main scanning direction and then from the other side.

When sequentially turning ON different parts of the first light source 16 in this manner, it is preferable that the second light source 18 be also turned ON. This enhances the accuracy in determining the normal angle.

If the first light source 16 is only turned ON, a shade extending in the sub-scanning direction may appear in a specific portion 40, which may decrease the accuracy in determining the normal angle.

Turning ON the second light source 18 together with the first light source 16 makes it less likely to cause this type of shade, thereby maintaining the accuracy in determining the normal angle.

When the second light source 18 is turned ON together with the first light source 16, the same position of the second light source 18 as that of the first light source 16 in the main scanning direction is turned ON.

For example, when the end portion 16A of the first light source 16 in its longitudinal direction is turned ON, an end portion 18A (see FIG. 7A) of the second light source 18 in its longitudinal direction is turned ON. When the other end portion 16B of the first light source 16 in its longitudinal direction is turned ON, the other end portion 18B (see FIG. 7B) of the second light source 18 in its the longitudinal direction is turned ON.

Concerning the normal angle of the surface 40A of a specific portion 40, a component in the sub-scanning direction can be obtained as a result of executing processing in FIG. 6, while a component in the main scanning direction can be obtained as a result of executing processing in FIGS. 7A and 7B.

In the exemplary embodiment, as a result of executing processing shown in FIGS. 7A and 7B as well as that in FIG. 6, a component in the sub-scanning direction and a component in the main scanning direction concerning the normal angle can be obtained without the need to change the orientation of a subject to be measured.

Alternatively, the CPU 111 may instruct a user to rotate a subject.

More specifically, the CPU 111 may instruct a user to rotate a subject around the perpendicular line 70 with respect to the support plate 11D (see FIG. 3).

In the exemplary embodiment, when the scanner 10 reads a subject, this subject is placed on the flat support plate 11D of the first platen glass 11A (see FIG. 3).

The CPU 111 instructs a user to rotate the subject around the perpendicular line 70 with respect to the support plate 11D. More specifically, the CPU 111 instructs the user to rotate the subject by 90°, for example, around the perpendicular line 70.

Figure 8:
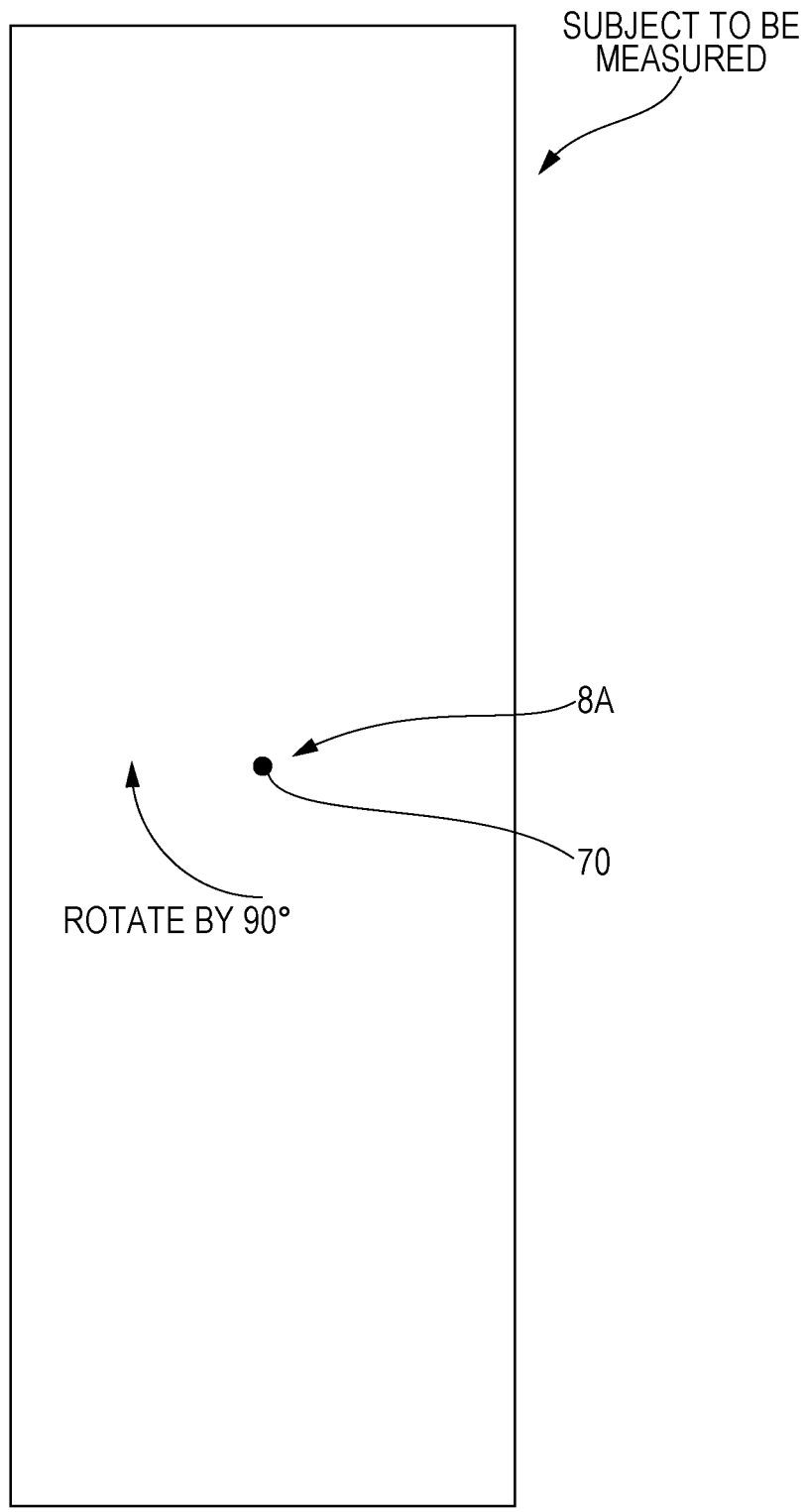
FIG. 8 illustrates a subject as viewed from the direction indicated by the arrow VIII in FIG. 3.

FIG. 8 illustrates a subject as viewed from the direction indicated by the arrow VIII in FIG. 3.

The perpendicular line 70 perpendicular to the support plate 11D is indicated by the arrow 8A in FIG. 8. The CPU 111 instructs a user to rotate the subject by 90°, for example, around the perpendicular line 70.

For example, the CPU 111 displays a message "Please rotate the subject by 90°" on the display 61 (see FIG. 1).

After the user has rotated the subject, the CPU 111 moves the reading unit 12 in the state in which the first light source 16 is ON and then moves the reading unit 12 in the state in which the second light source 18 is ON, as described above.

Figure 12A:
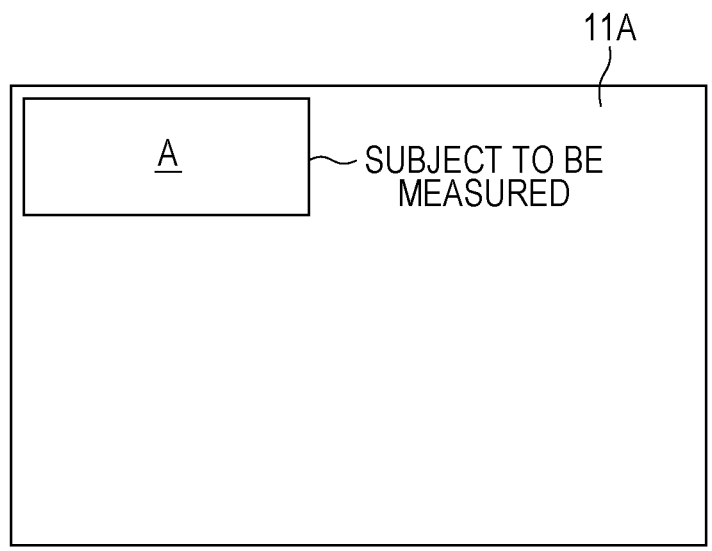
FIGS. 12A and 12B illustrate first platen glass as viewed from above.
Figure 12B:
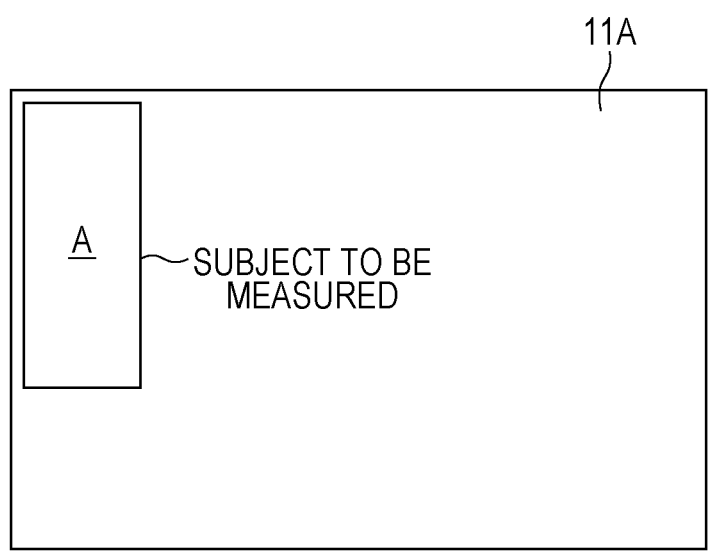

FIGS. 12A and 12B illustrate the first platen glass 11A as viewed from above. As shown in FIGS. 12A and 12B, a rectangular subject is placed on the first platen glass 11A with its corner adjusted to the top left of the first platen glass 11A. When the user has rotated the subject, the state of the subject is changed from that in FIG. 12A to that in FIG. 12B. Then, the CPU 111 moves the reading unit 12 in the state in which the first light source 16 is ON, and then moves the reading unit 12 in the state in which the second light source 18 is ON.

As a result, regarding the normal angle of the surface 40A of the specific portion 40, a component in the direction along the long sides of the rectangular subject and a component in the direction along the short sides are determined.

One approach to determining a component of the normal angle of the surface 40A of the specific portion 40 in the main scanning direction is to turn ON multiple parts of the first light source 16, as stated above.

Another approach is to rotate a subject as discussed above. If this approach is employed, an image, which serves as a positional reference, is provided to a subject in advance, and, based on this image, a component in the sub-scanning direction and a component in the main scanning direction for each specific portion 40 are determined.

Additionally, the scanner 10 may judge whether the subject has been rotated by 90°, and if the subject has not been rotated by 90°, an instruction to displace the subject may be provided via the display 61.

A judgement as to whether the subject has been rotated by 90° may be made in accordance with whether the corresponding side of the rotated subject is disposed along the main scanning direction or the sub-scanning direction.

If the corresponding side of the rotated subject is disposed along the main scanning direction or the sub-scanning direction, it is judged that the subject has been rotated by 90°.

If the corresponding side of the rotated subject is not disposed along the main scanning direction or the sub-scanning direction, it is judged that the subject has not been rotated by 90°. In this case, a message instructing a user to displace the subject is provided via the display 61.

The third light source 20 may also be used to apply light to a specific portion 40. More specifically, the CPU 111 may move the reading unit 12 in the state in which only the third light source 20 is ON and receive light reflected by the specific portion 40.

In this case, light is applied to the specific portion 40 sequentially from multiple directions whose angles with respect to the perpendicular line 70 are different from each other.

More specifically, in addition to the second light source 18, the third light source 20 is also turned ON, so that the specific portion 40 can be irradiated with light sequentially from different directions.

As shown in FIG. 3, the angle θ2 between the perpendicular line 70 and the optical path R2 through which light travels from the second light source 18 to the specific portion 40 is different from the angle θ3 between the perpendicular line 70 and the optical path R3 through which light travels from the third light source 20 to the specific portion 40.

As a result of sequentially turning ON the second and third light sources 18 and 20, light is applied to the specific portion 40 sequentially from multiple directions whose angles with respect to the perpendicular line 70 are different from each other.

In other words, as a result of sequentially turning ON the second and third light sources 18 and 20, the specific portion 40 is irradiated with light sequentially from a region where the second light source 18 is located and another region where the third light source 20 is located.

The specific portion 40 is thus irradiated with light sequentially from different directions.

Figure 9:
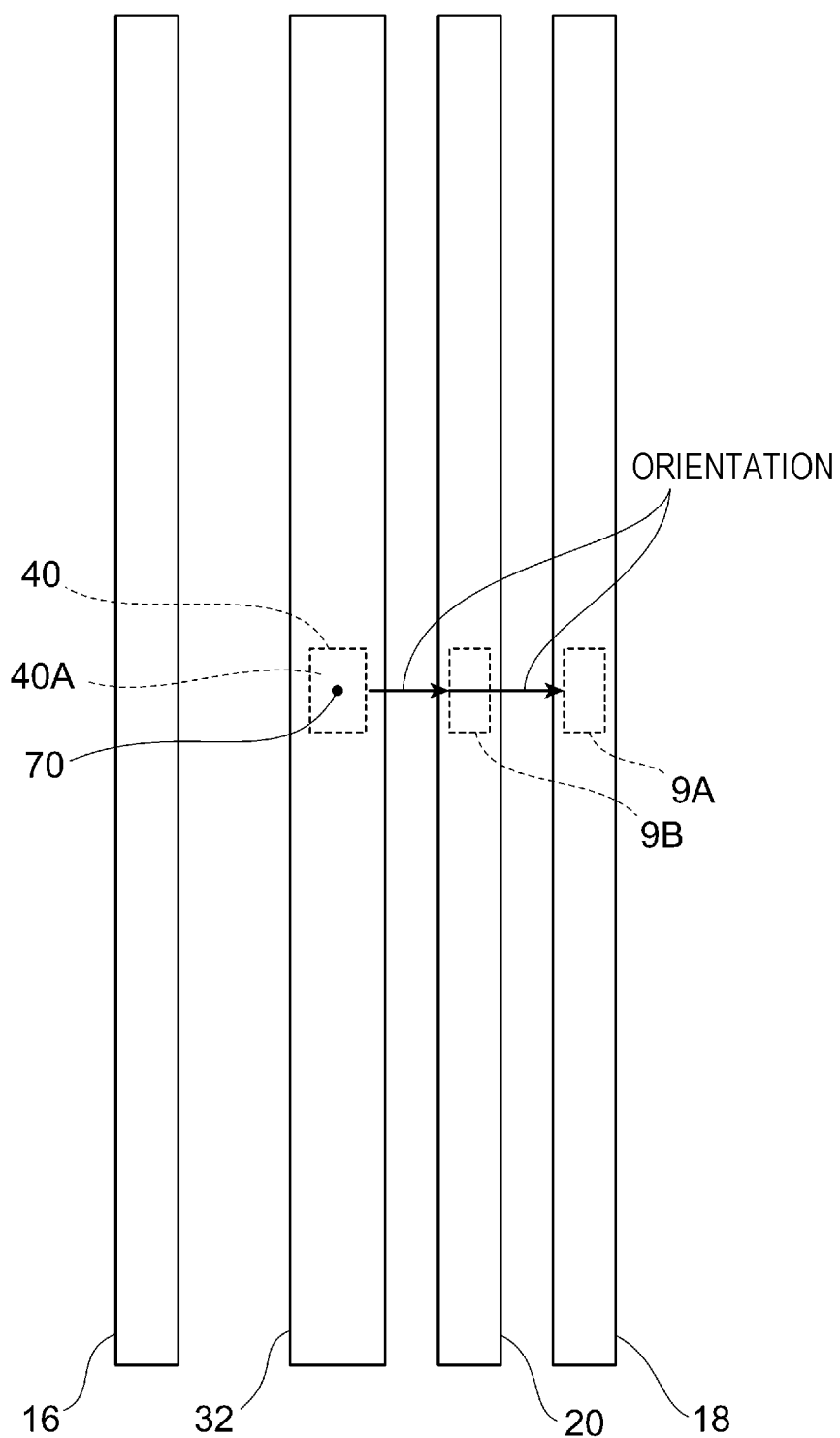
FIG. 9 illustrates the first, second, and third light sources and the sensor as viewed from the direction indicated by the arrow IX in FIG. 3.

FIG. 9 illustrates the first, second, and third light sources 16, 18, and 20 and the sensor 32 as viewed from the direction indicated by the arrow IX in FIG. 3.

Focusing on a point light source 9A (hereinafter called a first point light source 9A) and a point light source 9B (hereinafter called a second point light source 9B) in FIG. 9, the angle between the orientation in which the first point light source 9A is seen from the perpendicular line 70 and that in which the second point light source 9B is seen from the perpendicular line 70 is smaller than 90°.

More specifically, the orientation in which the first point light source 9A is seen from the perpendicular line 70 and that in which the second point light source 9B is seen from the perpendicular line 70 are aligned with each other, and the angle between the two orientations is accordingly 0°, which is smaller than 90°.

In the exemplary embodiment, when the second and third light sources 18 and 20 are sequentially turned ON, light is applied to a specific portion 40 sequentially from the first point light source 9A and the second point light source 9B.

In this case, the specific portion 40 is irradiated with light sequentially from two point light sources (two regions) in which the angle between the orientation of one point light source with respect to the perpendicular line 70 and that of the other point light source with respect to the perpendicular line 70 is 0°.

In the exemplary embodiment, as a result of turning ON the third light source 20 in addition to the first and second light sources 16 and 18, light is applied to a specific portion 40 from three different light sources (first, second, and third light sources 16, 18, and 20) disposed at different positions. This further improves the accuracy in determining the normal angle, compared with when light is applied only from two light sources.

More specifically, when the third light source 20 is also turned ON, the above-described fitting can be conducted based on five pixel values corresponding to five angles of incidence, thereby further enhancing the accuracy in determining the normal angle.

In the above-described example, fitting is executed based on the four pixel values corresponding to the four angles of incidence (−180°, −45°, +45°, +180°).

In contrast, when the third light source 20 is also turned ON, fitting is executed based on five pixel values corresponding to five angles of incidence (−180°, −45°, +45°, +180°, +5°), thereby further enhancing the accuracy in determining the normal angle.

For example, if a specific portion 40 has a sharp unevenness or is considerably black, two pixel values corresponding to two angles of incidence (−45°, +45°) may become similar to each other. In this case, the peak of a spline curve subjected to fitting may not appear distinctively.

In contrast, if the third light source 20 is turned ON, as in the exemplary embodiment, the peak of a spline curve is likely to appear distinctively, thereby enhancing the accuracy in determining the normal angle.

[Shading Correction]

Shading correction will be discussed.

In the exemplary embodiment, the white reference plate (see FIG. 1) is provided, as stated above.

To perform shading correction, light is applied from each of the first and second light sources 16 and 18 to the white reference plate 71, which serve as a common irradiation subject.

More specifically, to determine the normal angle, shading correction is first conducted for the first and second light sources 16 and 18. Light is first applied to the white reference plate 71 sequentially from the first and second light sources 16 and 18 in the state in which the reading unit 12 is placed under the white reference plate 71.

In the exemplary embodiment, the CPU 111 obtains information on light received by the sensor 32 when light is applied from the first light source 16 to the reference plate 71 (such information will be called first light information) and information on light received by the sensor 32 when light is applied from the second light source 18 to the reference plate 71 (such information will be called second light information).

The CPU 111 then generates two items of correction information, based on the first light information and the second light information.

More specifically, based on the first light information and the second light information, the CPU 111 generates first correction information used for correcting information on light received by the sensor 32 when light is applied from the first light source 16 to a specific portion 40, and also generates second correction information used for correcting information on light received by the sensor 32 when light is applied from the second light source 18 to the specific portion 40.

This makes it less likely to vary output values from the sensor 32 due to the difference in the light sources.

There may be nonuniformities in the amount of light emitted from each of the first and second light sources 16 and 18. In this case, even if the normal angle of a specific portion 40 is 0°, in other words, even if the same specific portion 40 is read under the same condition, the output value from the sensor 32 when light is applied from the first light source 16 to the specific portion 40 and that when light is applied from the second light source 18 to the specific portion 40 may become different from each other.

In the exemplary embodiment, the above-described two items of correction information, i.e., the first correction information and the second correction information, are generated so that information on light received by the sensor 32 when light is applied from the first light source 16 to the common reference plate 71 (the normal angle is 0°) and information on light received by the sensor 32 when light is applied from the second light source 18 to the common reference plate 71 become equal to each other.

More specifically, the first correction information and the second correction information are generated for each of the multiple light-receiving elements 32A provided in the sensor 32.

Then, every time the sensor 32 receives light reflected by a specific portion 40 irradiated with light, the output value from each light-receiving element 32A is corrected by using one of the first correction information and the second correction information.

More specifically, when the sensor 32 has received light reflected by a specific portion 40 irradiated with light emitted from the first light source 16, the CPU 111 corrects the output value from each light-receiving element 32A by using the first correction information.

When the sensor 32 has received light reflected by a specific portion 40 irradiated with light emitted from the second light source 18, the CPU 111 corrects the output value from each light-receiving element 32A by using the second correction information.

This makes it less likely to decrease the accuracy in determining the normal angle due to the difference in the light sources.

In the above-described example, shading correction is performed for the first and second light sources 16 and 18. Shading correction is also conducted for the third light source 20 in a similar manner.

More specifically, the CPU 111 generates correction information so that information on light received by the sensor 32 when light is applied from the first light source 16 to the reference plate 71 and that when light is applied from the third light source 20 to the reference plate 71 become equal to each other.

[Outputting of Tilt Information]

In the exemplary embodiment, as stated above, the image reading apparatus 1 obtains color information concerning the color of a subject and outputs the color information in a predetermined data format.

The CPU 111 obtains information concerning a tilt (normal angle) of the surface 40A of a specific portion 40 and outputs this information (hereinafter called tilt information) in a predetermined data format of the same type as that for outputting the color information.

In the exemplary embodiment, color information is output in a data format of three consecutive RGB values. Tilt information is also output in a data format of three consecutive values.

More specifically, tilt information is output in a data format of three consecutive XYZ values. The X value represents an X component, which is a component of the normal angle in the sub-scanning direction. The Y value represents a Y component, which is a component of the normal angle in the main scanning direction. The Z value represents a Z component, which is a component of the normal angle in a direction perpendicular to the main scanning direction and the sub-scanning direction.

As a result of outputting tilt information in a data format of the same type as that for outputting color information in this manner, a computer which receives this tilt information is able to display the amount of tilt of each specific portion 40 by using different colors without using special software.

In other words, by using software for displaying the color of each pixel based on the RGB values, the computer is able to display the amount of tilt of each specific portion 40 by using colors.

To output tilt information in a data format of the same type as that for outputting color information, the CPU 111 first determines a tangent vector Nx=(1, 0, X') in the sub-scanning direction from the normal angle concerning the sub-scanning direction. The CPU 111 also determines a tangent vector Ny=(0, 1, Y') in the main scanning direction from the normal angle concerning the main scanning direction.

The CPU 111 then find the cross product of these two tangent vectors Nx and Ny so as to determine the three-dimensional normal vector N. Then, the CPU 111 calculates the norm of the three-dimensional normal vector N and normalizes the three-dimensional normal vector N (n=N/|N|).

The CPU 111 then adds one to each component of n, divides the resulting value by two, and multiplies the resulting value by 255, thereby determining the value corresponding to each of the XYZ components.

The CPU 111 then outputs the three values corresponding to the XYZ components in the above-described data format.

[Obtaining of Color Information]

In the above-described example, processing for obtaining tilt information has principally been discussed. In this processing, color information is first removed by forming a color image into a grayscale image as discussed above, and then, tilt information is obtained from the grayscale image.

To obtain color information about a subject, the subject is read by moving the reading unit 12 in the state in which the first and second light sources 16 and 18 are both ON.

That is, to obtain color information about the subject, the subject is scanned by both turning ON the first and second light sources 16 and 18, separately from scanning for obtaining tilt information.

Scanning a subject by both turning ON the first and second light sources 16 and 18 makes it less likely to cause a shade in the subject, thereby maintaining the precision in reading the subject.

The order of the execution of scanning for obtaining color information and scanning for obtaining tilt information is not restricted, and either scanning may be performed first.

[Others]

In the above-described example, two light sources, i.e., the first and second light sources 16 and 18, are used, and by sequentially and separately turning ON the first and second light sources 16 and 18, light is applied to a specific portion 40 from multiple directions.

Figure 10:
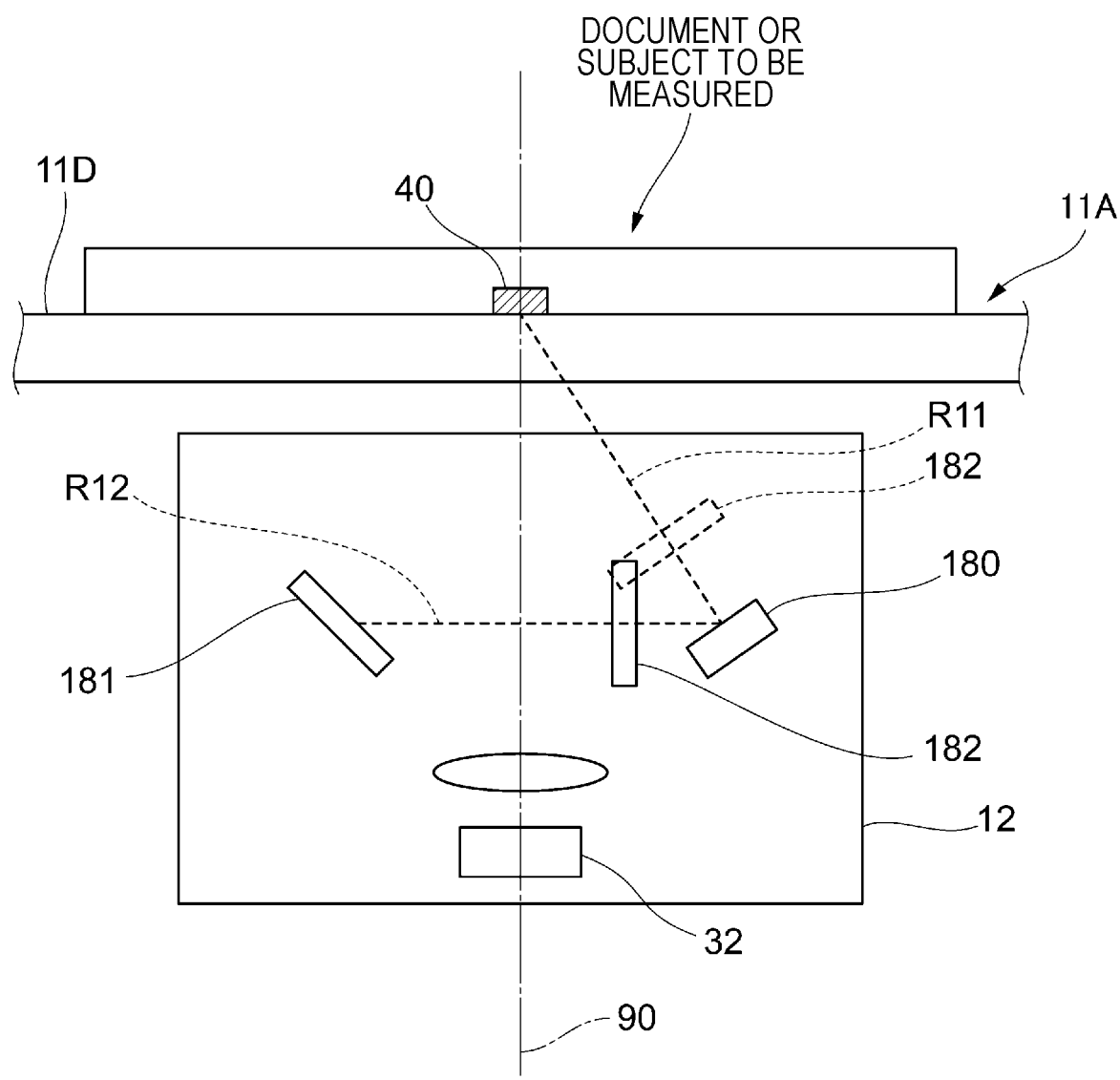
FIG. 10 illustrates another example of the configuration of the reading unit.

However, the provision of multiple light sources is not inevitable. FIG. 10 illustrates another example of the configuration of the reading unit 12. As shown in FIG. 10, even with one light source, a specific portion 40 can be irradiated with light from multiple directions.

In the reading unit 12 configured as shown in FIG. 10, a light source 180 is disposed in the region on the right side of the plane 90.

In the region on the left side of the plane 90, a light reflector 181, such as a mirror which reflects light from the light source 180 toward the specific portion 40, is disposed.

A light blocking member 182 is also provided to block light emitted from the light source 180.

The light blocking member 182 is movable and shifts to a first optical path R11 heading from the light source 180 to the specific portion 40 and to a second optical path R12 heading from the light source 180 to the light reflector 181.

In the above-described configuration, to apply light to the specific portion 40 from the bottom left direction, the light blocking member 182 is located on the first optical path R11 so as to apply light from the light reflector 181.

To apply light to the specific portion 40 from the bottom right direction, the light blocking member 182 is located on the second optical path R12 so as to apply light from the light source 180.

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A measurement apparatus comprising:
a light irradiator that is able to apply light from a plurality of directions to a specific portion of a subject to be measured;
a light receiver that receives light reflected by the specific portion; and
a processor configured to
cause the light irradiator to apply light to the specific portion sequentially from the plurality of directions, and
acquire information concerning a tilt of a surface of the specific portion, based on information on light received by the light receiver when light is applied to the specific portion from a first direction and information on light received by the light receiver when light is applied to the specific portion from a second direction, the plurality of directions including the first and second directions, wherein
the light irradiator includes a plurality of light sources and a first light source of the plurality of light sources is linear, and
the processor is configured to cause the light irradiator to turn ON a part of the first light source and then to turn ON another part of the first light source and to apply light to the specific portion sequentially from the plurality of directions.

2. The measurement apparatus according to claim 1, further comprising:
a support plate that supports the subject, wherein
the light irradiator is configured to apply light to the specific portion from each of a plurality of regions located around a perpendicular line, the perpendicular line being perpendicular to the support plate and passing through the specific portion, an orientation in which each of the plurality of regions is seen along the perpendicular line being different from an orientation in which another one of the plurality of regions is seen along the perpendicular line, and
the processor is configured to cause the light irradiator to apply light to the specific portion sequentially from the plurality of regions.

3. The measurement apparatus according to claim 2, wherein:
the light irradiator is configured to apply light to the specific portion from a first region and a second region of the plurality of regions,
an angle between (i) the first region when viewed along the perpendicular line and (ii) the second region when viewed along the perpendicular line is greater than 90°; and
the processor is configured to cause the light irradiator to apply light to the specific portion sequentially from at least the first region and the second region.

4. The measurement apparatus according to claim 2, wherein:
the light irradiator is configured to apply light to the specific portion from a first region and a second region of the plurality of regions,
an angle between (i) the first region when viewed along the perpendicular line and (ii) the second region when viewed along the perpendicular line is 180°; and
the processor is configured to cause the light irradiator to apply light to the specific portion sequentially from at least the first region and the second region.

5. The measurement apparatus according to claim 3, wherein
(i) a first angle is an angle between the perpendicular line and an optical path through which light travels from the first region to the specific portion and (ii) a second angle is an angle between the perpendicular line and an optical path through which light travels from the second region to the specific portion, and
the first angle and the second angle are equal to each other.

6. The measurement apparatus according to claim 4, wherein
(i) a first angle is an angle between the perpendicular line and an optical path through which light travels from the first region to the specific portion and an (ii) a second angle is angle between the perpendicular line and an optical path through which light travels from the second region to the specific portion,
the first angle and the second angle are equal to each other.

7. The measurement apparatus according to claim 1, wherein:
the plurality of light sources is disposed at different positions; and
the processor is configured to cause the light irradiator to sequentially and separately turn ON the plurality of light sources.

8. The measurement apparatus according to claim 1, wherein the part of the first light source is at one end portion of the first light source in the longitudinal direction of the first light source and the other part of the first light source is at the other end portion of the first light source in the longitudinal direction of the first light source.

9. The measurement apparatus according to claim 1, further comprising:
a support plate that supports the subject,
wherein the plurality of directions are directions whose angles with respect to a perpendicular line are different from each other, the perpendicular line being perpendicular to the support plate and passing through the specific portion.

10. The measurement apparatus according to claim 9, wherein:
the light irradiator applies light sequentially from at least first and second regions so as to apply light to the specific portion from the plurality of directions;
the processor causes the light irradiator to apply light to the specific portion sequentially from at least the first and second regions; and
an angle between (i) the first region when viewed along the perpendicular line and (ii) the second region when viewed along the perpendicular line is smaller than 90°.

11. The measurement apparatus according to claim 1, further comprising:
a support plate that supports the subject,
wherein the processor is configured to instruct a user to rotate the subject around a perpendicular line which is perpendicular to the support plate.

12. The measurement apparatus according to claim 11, wherein the processor is configured to instruct the user to rotate the subject around the perpendicular line by 90°.

13. The measurement apparatus according to claim 1, wherein:
the light irradiator includes a second light source, the first light source being used for applying light to the specific portion from the first direction, the second light source being used for applying light to the specific portion from the second direction; and
based on information on light received by the light receiver when light is applied from the first light source to a common irradiation subject and information on light received by the light receiver when light is applied from the second light source to the common irradiation subject, the processor is configured to generate (i) correction information used for correcting shading information on light received by the light receiver when light is applied from the first light source to the specific portion and (ii) correction information used for correcting shading information on light received by the light receiver when light is applied from the second light source to the specific portion.

14. The measurement apparatus according to claim 1, wherein:
   color information concerning a color of a subject to be measured by the measurement apparatus is output from the measurement apparatus in a predetermined format; and
   the processor is configured to output tilt information in a predetermined format of the same type as the predetermined format used for outputting the color information, the tilt information being the information concerning the tilt of the surface of the specific portion.

15. A non-transitory computer readable medium storing a program causing a computer to execute a process, the process comprising:
   causing a light irradiator to apply light sequentially from a plurality of directions to a specific portion of a subject to be measured; and
   acquiring information concerning a tilt of a surface of the specific portion, based on information on light received by a light receiver when light is applied to the specific portion from a first direction and information on light received by the light receiver when light is applied to the specific portion from a second direction, the plurality of directions including the first and second directions, wherein
   the light irradiator includes a plurality of light sources and a first light source of the plurality of light sources is linear, and
   the process further includes causing the light irradiator to turn ON a part of the first light source and then to turn ON another part of the first light source and applying light to the specific portion sequentially from the plurality of directions.

16. An information processing apparatus comprising:
   a processor configured to
      process information output from a light receiver which receives light reflected by a specific portion of a subject to be measured, the light having been applied by a light irradiator to the specific portion sequentially from a plurality of directions, wherein
   the processor is configured to
      obtain first information, the first information being information on light received by the light receiver when light is applied to the specific portion from a first direction,
      obtain second information, the second information being information on light received by the light receiver when light is applied to the specific portion from a second direction, and
      acquire information concerning a tilt of a surface of the specific portion, based on the first information and the second information, wherein
   the light irradiator includes a plurality of light sources and a first light source of the plurality of light sources is linear, and
   the processor is further configured to cause the light irradiator to turn ON a part of the first light source and then to turn ON another part of the first light source and apply light to the specific portion sequentially from the plurality of directions.

17. The information processing apparatus according to claim 16, wherein the processor is configured to
   obtain information concerning intensity of light received by the light receiver as each of the first information and the second information, and
   acquire the information concerning the tilt of the surface of the specific portion, based on the information concerning the intensity of light obtained as the first information and the information concerning the intensity of light obtained as the second information.

\* \* \* \* \*